(12) United States Patent
Choi (10) Patent No.: US 8,134,338 B2
(45) Date of Patent: Mar. 13, 2012

(54) BATTERY MANAGEMENT SYSTEM AND DRIVING METHOD THEREOF

(75) Inventor: Won-Suk Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1139 days.

(21) Appl. No.: 11/947,712

(22) Filed: Nov. 29, 2007

(65) Prior Publication Data

US 2008/0211459 A1 Sep. 4, 2008

(30) Foreign Application Priority Data

Mar. 2, 2007 (KR) .................. 10-2007-0021132

(51) Int. Cl.
- H02J 7/04 (2006.01)
- G01N 27/416 (2006.01)
- G08B 21/00 (2006.01)
- B60W 10/24 (2006.01)

(52) U.S. Cl. ........ 320/134; 320/149; 320/155; 324/426; 324/434; 324/522; 340/636.1; 340/636.21; 180/65.29; 180/65.21; 180/65.1

(58) Field of Classification Search .................. 320/134
See application file for complete search history.

(56) References Cited

U.S. PATENT DOCUMENTS

| | | | | |
|---|---|---|---|---|
| 6,639,409 B2 * | 10/2003 | Morimoto et al. | ............ | 324/434 |
| 7,003,431 B2 * | 2/2006 | Quint et al. | .................... | 702/183 |
| 7,126,341 B2 * | 10/2006 | Bertness et al. | ............ | 324/426 |
| 2003/0025481 A1 * | 2/2003 | Bertness | ........................ | 320/155 |
| 2003/0146737 A1 * | 8/2003 | Kadouchi et al. | ............ | 320/132 |
| 2005/0234663 A1 * | 10/2005 | Quint et al. | ..................... | 702/63 |

FOREIGN PATENT DOCUMENTS

| JP | 08-251829 A | 9/1996 |
|---|---|---|
| KR | 1999-010659 | 3/1999 |
| KR | 10-2003-0089899 A | 11/2003 |
| KR | 10-2004-0000945 A | 1/2004 |
| KR | 10-2006-0083343 A | 7/2006 |

* cited by examiner

Primary Examiner — Yalkew Fantu
(74) Attorney, Agent, or Firm — Christie, Parker & Hale, LLP (57) ABSTRACT

A battery management system is provided for managing a battery that supplies power to a vehicle. The battery includes a plurality of cells. The battery management system includes a sensing unit for measuring a voltage of each of the plurality of cells. The battery management system detects at least one first cell among the plurality of cells that needs to be balanced according to the measured voltage of each of the plurality of cells. In addition, the battery management system performs a cell balancing operation on said at least one first cell by using different methods according to a driving state of the vehicle.

19 Claims, 7 Drawing Sheets

BATTERY MANAGEMENT SYSTEM AND DRIVING METHOD THEREOF

CROSS-REFERENCE TO RELATED APPLICATION

This application claims priority to and the benefit of Korean Patent Application No. 10-2007-0021132 filed in the Korean Intellectual Property Office on Mar. 2, 2007, the entire content of which is incorporated herein by reference.

BACKGROUND OF THE INVENTION

1. Field of the Invention

The present invention relates to a battery management system, and more particularly, to a battery management system for a vehicle and a driving method thereof.

2. Description of the Related Art

Vehicles using an internal combustion engine powered by gasoline or diesel have caused serious air pollution. Accordingly, various efforts for developing electric or hybrid vehicles have recently been undertaken to reduce air pollution.

An electric vehicle uses an electric motor operating by electrical energy output by a battery. Because the electric vehicle mainly uses a battery formed by one battery pack including a plurality of rechargeable/dischargeable secondary cells, there are no emission gasses and the electric vehicle makes less noise.

A hybrid vehicle commonly refers to a gasoline-electric hybrid vehicle that uses gasoline to power an internal-combustion engine and a battery to power an electric motor.

In order to enhance output power of a vehicle using a battery as a power source, the number of rechargeable battery cells has increased, and a battery management system (BMS) is required for efficiently managing a plurality of cells connected to each other.

When a plurality of cells are serially connected, balance between the cells is important. In order to maintain a balance between the cells, a voltage difference between a plurality of cells forming a battery is maintained within an allowable range. The balance between the cells will be referred to as "cell balancing." The cell balancing is closely related to cycle life and the output power of the battery. When the cells are not balanced, the cells deteriorate such that the cycle-life of the battery is reduced, thereby reducing the output power.

In addition, a conventional cell balancing method uses a discharge path that is formed according to control of a main controller. In this case, the discharge path includes a resistance. The main controller compares a voltage of each cell with a predetermined voltage by using a comparator so as to determine whether the cells are balanced. Therefore, a lot of time is required for determining cell balancing. In addition, constituent elements of a circuit for cell balancing are increased as the number of cells forming the battery is increased, and accordingly, wiring is additionally required for information exchange between a main controller and the cells. Further, when the number of cells increases, another main controller is required.

SUMMARY OF THE INVENTION

A battery management system for managing a battery is provided. The battery supplies power to a vehicle and includes a plurality of cells. The battery management system includes a sensing unit for measuring a voltage of each of the plurality of cells. The battery management system detects at least one first cell among the plurality of cells needing to be balanced according to a measured voltage of each of the plurality of cells, and performs a cell balancing operation on said at least one first cell by using different methods depending upon an operational state of the vehicle.

According to an exemplary embodiment of the present invention, the battery management system further includes a cell balancing determiner for detecting said at least one first cell by comparing the measured voltage of each of the plurality of cells with a normal range. In addition, the battery management system includes a cell balancing controller for controlling a voltage of said at least one first cell to be discharged when the vehicle is in a temporary stop state, a running state, or a stop state. Furthermore, the battery management system includes a cell balancing unit for discharging the voltage of said at least one first cell.

According to an exemplary embodiment of the present invention, when the vehicle is in the stop state, the cell balancing determiner detects an over-charged cell or an over-discharged cell from among the plurality of cells, and the cell balancing unit receives energy from the over-charged cell and transmits the energy received from the over-charged cell to the over-discharged cell.

According to an exemplary embodiment of the present invention, the cell balancing unit includes a plurality of first cell balancing switches having first ends respectively coupled to the plurality of cells and second ends coupled to a first output terminal; a plurality of second cell balancing switches having first ends respectively coupled to the plurality of cells and second ends coupled to a second output terminal; a first cell balancing driver for discharging said at least one first cell when the vehicle is in the temporary stop state or the running state; a second cell balancing driver for transmitting the energy received from the over-charged cell to the over-discharged cell when the vehicle is in the stop state; a first relay for connecting the first cell balancing driver, the first output terminal, and the second output terminal; and a second relay for connecting the second cell balancing driver, the first output terminal, and the second output terminal.

According to an exemplary embodiment of the present invention, when the vehicle is in the temporary stop state or the running state, the cell balancing controller turns on the first relay and turns on first switches and second switches among the plurality of first cell balancing switches and the plurality of second cell balancing switches that correspond to said at least one first cell.

According to an exemplary embodiment of the present invention, the first relay has a first relay first end and a first relay second end. The first cell balancing driver includes a first resistor having a first resistor first end and a first resistor second end. The first resistor first end is coupled to the first relay first end. A second resistor has a second resistor first end and a second resistor second end. The second resistor first end is coupled to the first relay first end and to the first resistor first end. A first transistor has a first transistor first electrode, a first transistor second electrode, and a first transistor control electrode. The first transistor first electrode is coupled to the second transistor second end. The first transistor second electrode is coupled to the first relay second end. A second transistor has a second transistor first electrode and a second transistor second electrode. The second transistor first electrode is coupled to the first resistor second end. A third resistor has a third resistor first end and a third resistor second end. The third resistor first end is coupled to the second transistor second electrode and to the first transistor control electrode. The third resistor second end is coupled to the first transistor second electrode and to the first relay second end. A photodiode forms a photocoupler with the second transistor. The photodiode has a photodiode anode electrode and a photodiode cathode electrode. A first power source is coupled to the photodiode anode electrode. A fourth resistor has a fourth resistor first end and a fourth resistor second end. The fourth resistor first end is coupled to the photodiode cathode electrode. A fifth resistor has a fifth resistor first end and a fifth resistor second end. The fifth resistor first end is coupled to the first power source. The fifth resistor second end is coupled to the fourth resistor first end and to the photodiode cathode electrode.

According to an exemplary embodiment of the present invention, the cell balancing controller transmits a discharge control signal to the fourth transistor second end to permit a driving current to flow to the photodiode.

According to an exemplary embodiment of the present invention, a bias current flows to the second transistor in response to the driving current, and the first transistor is turned on by a bias voltage applied to the first transistor control electrode and to the first transistor second electrode in response to the bias current and the third resistor.

According to an exemplary embodiment of the present invention, when the first transistor is turned on, charges of said at least one first cell are discharged by a discharge path having the second resistor and the first transistor so that a voltage of said at least one first cell is decreased.

According to an exemplary embodiment of the present invention, wherein when the vehicle is in the stop state, the cell balancing controller turns on first switches and second switches among the plurality of first cell balancing switches and the plurality of second cell balancing switches that correspond to the over-charged cell, and turns off the first switches and the second switches when a voltage of the over-charged cell reaches the normal range.

According to an exemplary embodiment of the present invention, after turning off the first switches and the second switches when the vehicle is in the stop state, the cell balancing controller turns on third switches among the plurality of first cell balancing switches corresponding to the over-discharged cell, and turns on fourth switches among the plurality of second cell balancing switches corresponding to the over-discharged cell.

According to an exemplary embodiment of the present invention, when the vehicle is in the stop state, the cell balancing controller turns off the third switches and the fourth switches when the voltage of the over-discharged cell reaches the normal range.

According to an exemplary embodiment of the present invention, the second relay has a second relay first end and a second relay second end. The second cell balancing driver includes an inductor having an inductor first end and an inductor second end. The inductor first end is coupled to the second relay first end. The inductor second end is coupled to the second relay second end. The inductor stores energy transmitted through the first switches, the second switches, and the second relay.

According to an exemplary embodiment of the present invention, the energy stored in the inductor is transmitted to the over-discharged cell through the third switches, the fourth switches, and the second relay.

According to an exemplary embodiment of the present invention, the second cell balancing driver further comprises a capacitor coupled in parallel with the inductor.

According to an exemplary embodiment of the present invention, the battery management system further includes a connection port unit coupled to the plurality of cells. The connection port unit couples the battery management system and the plurality of cells.

According to an exemplary embodiment of the present invention, the battery management system is formed of one chip.

According to an exemplary embodiment of the present invention, a driving method of a battery management system for managing a battery is provided. The battery supplies power to a vehicle and includes a plurality of cells. The driving method includes a) determining a driving state of the vehicle; b) sensing a voltage of each of the plurality of cells; c) determining a cell needing to be balanced among the plurality of cells; and d) performing a cell balancing operation on the cell by using different methods depending upon an operational state of the vehicle.

According to an exemplary embodiment of the present invention, in a), when the vehicle is in a stop state, c) comprises detecting an over-charged cell and an over-discharged cell, and d) comprises performing the cell balancing operation on the over-charged cell and the over-discharged cell by transmitting energy from the over-charged cell to the over-discharged cell.

According to an exemplary embodiment of the present invention, in a), when the vehicle is in a temporary stop state or a running state, c) comprises detecting an over-charged cell, and d) comprises performing the cell balancing operation by discharging the over-charged cell.

DETAILED DESCRIPTION

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" and "comprising" will be understood to imply the inclusion of stated elements but not the exclusion of any other elements.

Figure 1:
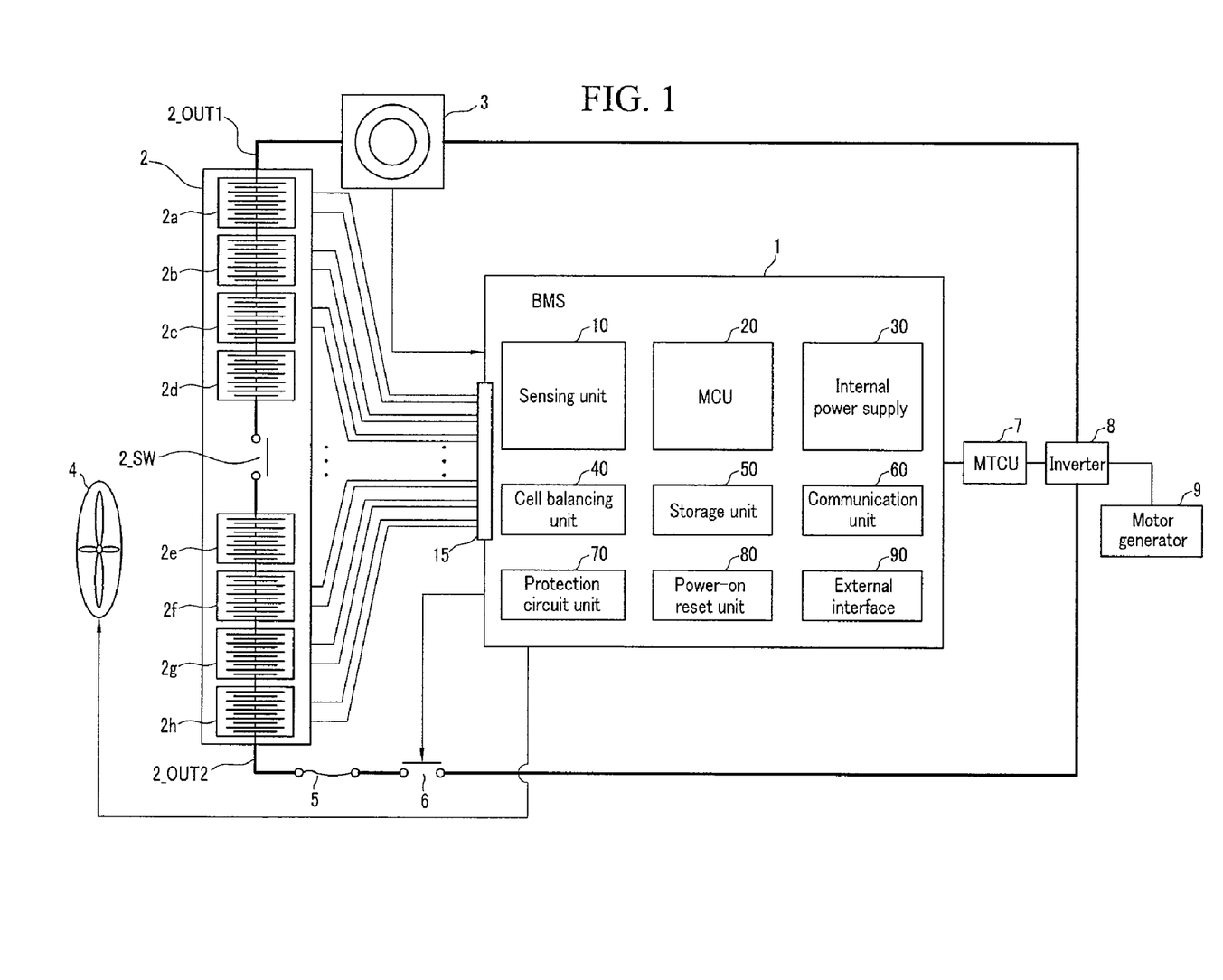
FIG. 1 schematically shows a battery, a battery management system (BMS), and a peripheral device of the BMS according to an exemplary embodiment of the present invention.

FIG. 1 schematically shows a battery, a BMS 1, and a peripheral device of the BMS 1 according to an exemplary embodiment of the present invention. The BMS 1 according to an exemplary embodiment of the present invention is formed of one chip.

The battery 2 includes a plurality of sub-packs 2a to 2h having a plurality of battery cells coupled in series to each other, and output terminal 2_OUT1, an output terminal 2_OUT2, and a safety switch 2_SW provided between the sub-pack 2d and the sub-pack 2e. While eight sub-packs 2a to 2h are exemplified, and one sub-pack is a group of a plurality of battery cells in an exemplary embodiment of the present invention, it is not limited thereto. The safety switch 2_SW is manually turned on/off to guarantee safety for a worker when performing operations for the battery or replacing the battery. In the present exemplary embodiment, the safety switch 2_SW is provided between the sub-pack 2d and the sub-pack 2e, but it is not limited thereto. The output terminal 2_OUT1 and the output terminal 2_OUT2 are coupled to the inverter 8.

The current sensor 3 measures an output current value of the battery 2 and outputs the measured output current value to the sensing unit 10 of the BMS 1. The current sensor 3 may be provided as a Hall current transformer (Hall CT) using a Hall element to measure a current value and outputting an analog current signal corresponding to the measured current value. The sensor 3 transmits information on the measured current value of the battery 2 to the BMS 1.

The cooling fan 4 cools down heat generated by charging and discharging the battery 2 in response to a control signal of the BMS 1, and prevents the battery 2 from being deteriorated by a temperature increase and prevents the charging and discharging efficiency from being deteriorated.

The fuse 5 prevents an overflowing current, which may be caused by a disconnection or short circuit of the battery 2, from being transmitted to the battery 2. That is, when an overcurrent is generated, the fuse 5 is disconnected so as to interrupt the current from overflowing.

The main switch 6 turns on/off the battery 2 in response to the control signal of the BMS 1 when an unusual phenomenon, including an overflowed voltage, an over-current, and a high temperature, occurs.

The BMS 1 includes a sensing unit 10, a main control unit (MCU) 20 an internal power supply 30, a cell balancing unit 40, a storage unit 50, a communication unit 60, a protective circuit unit 70, a power-on reset unit 80, and an external interface 90. In addition, a plurality of cells are respectively electrically coupled to the BMS 1 through a connection port unit 15. The connection port unit 15 according to an exemplary embodiment of the present invention includes a number of connection terminals that is greater than the number of cells. Hereinafter, a plurality of connection terminals connected to the cells are referred to as cell connection terminals.

The sensing unit 10 is electrically coupled to a plurality of cells that form the battery 2 through a plurality of cell connection terminals. The sensing unit 10 measures each battery cell voltage and each battery terminal voltage and measures battery current by using an electrical signal transmitted from the Hall sensor 3. Further, the sensing unit 10 measures a cell temperature and a battery temperature. The sensing unit 10 transmits the battery cell voltage, the battery terminal voltage, the battery current, and the cell temperature to the MCU 20. The battery terminal voltage is a voltage between the output terminals 2_OUT1 and 2_OUT2, and the battery current is a current flowing to the battery.

The MCU 20 estimates a state of charge (SOC) and a state of health (SOH) based on the battery current, the battery terminal voltage, the respective battery cell voltages, the cell temperature, and an ambient temperature, which are transmitted from the sensing unit 10. The MCU 20 generates information that informs a state (i.e., SOC and SOH) of the battery 2 and transmits the information to the MoTor Control Unit (MTCU) 7 of the vehicle. The MTCU 7 controls charge or discharge of the battery 2 based on the SOC and the SOH. The MCU 20 according to an exemplary embodiment of the present invention can recognize the number of cells when the cell terminals of the connection port unit 15 are respectively coupled to the corresponding cells. The MCU 20 generates signals for controlling the cell balancing unit 40 corresponding to the recognized number of cells. A configuration and operation of the cell balancing unit 40 will be described in further detail later.

The internal power supply 30 supplies power by using a backup battery to transmit a voltage (e.g., a bias voltage) to the BMS 1 for operation.

The cell balancing unit 40 balances a SOC of each cell. That is, the cell balancing unit 40 controls a SOC of each cell to be within a reference range by charging/discharging a cell whose SOC is not within the reference range. Herein, the reference range may be set according to a battery terminal voltage, a SOC, a SOH, and temperature. In addition, the reference range may be set within a predetermined range that is set on the basis of an average value of the plurality of cell voltages. The cell balancing unit 40 operates according to a control signal of the MCU 20 that has received information on each cell voltage, or directly receives information on each cell voltage from the sensing unit 10, determines whether a cell is balanced or not based on the information, and balances each cell. The cell balancing unit 40 is electrically coupled to the respective cells through the plurality of cell connection terminals. The cell balancing unit 40 according to an exemplary embodiment of the present invention may use a different cell balancing method according to a driving state of the vehicle. The BMS and a driving method thereof according to an exemplary embodiment of the present invention will be described in further detail later with reference to FIG. 2, FIG. 3, FIG. 4, and FIG. 5.

When the BMS 1 is turned off, the storage unit 50 stores data including a current SOC and a current SOH. Herein, the storage unit 50 may be provided as a non-volatile electrically erasable programmable read-only memory (EEPROM).

The communication unit 60 communicates with the MTCU 7 of the vehicle. The protective circuit unit 70 uses firmware to protect the battery 2 from shocks, over-flowed currents, and low voltages.

The power-on reset unit 80 resets the overall system when the power source of the BMS 1 is turned on. The external interface 90 couples auxiliary devices for the BMS 1, such as the cooling fan 4 and the main switch 6. While the cooling fan 4 and the main switch 6 are shown as the auxiliary devices in the present exemplary embodiment, it is not limited thereto.

The MTCU 7 determines a torque state based on information on an accelerator, a brake, and a vehicle speed, and controls an output of the motor-generator 9 so that the output corresponds to the torque information. That is, the MTCU 7 controls the motor-generator 9 to output an output corresponding to the torque information by controlling a switching operation of the inverter 8. In addition, the MTCU 7 receives the SOC of the battery 2 from the MCU 20 through the communication unit 60 and controls the SOC level of the battery 2 to be a target level (e.g., 55%). For example, when the SOC level transmitted from the MCU 20 is less than 55%, the MTCU 7 controls the switching operation of the inverter 8 so as to output power toward the battery 2 and charge the battery 2. In this case, the battery pack current has a negative (−) value. When the SOC level is greater than 55%, the MTCU 7 controls the switching operation of the inverter 8 so as to output the power toward the motor-generator 9 and discharge the battery 2. In this case, the battery pack current has a positive (+) value.

The inverter 8 controls the battery 2 to be charged or discharged in accordance with a control signal of the MTCU 7.

The motor generator 9 uses the electrical energy of the battery 2 to drive the vehicle based on the torque information transmitted from the MTCU 7.

As described, the BMS 1 according to an exemplary embodiment of the present invention transmits battery information and a charge/discharge control signal to the MTCU 7 and the MTCU 7 performs charge or discharge, accordingly. In addition, in the BMS 1, each cell is balanced by using the sensing unit 10, the cell balancing unit 40, and the MCU 20.

Figure 2:
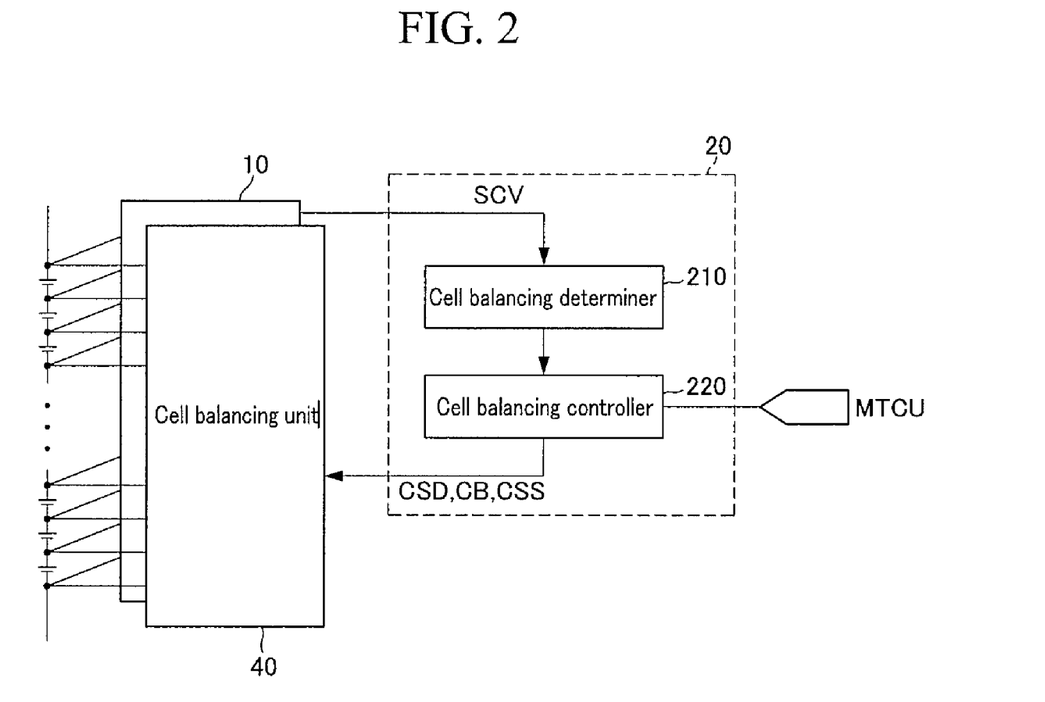
FIG. 2 shows a sensing unit, a cell balancing unit, and a main control unit (MCU) according to an exemplary embodiment of the present invention.
Figure 3:
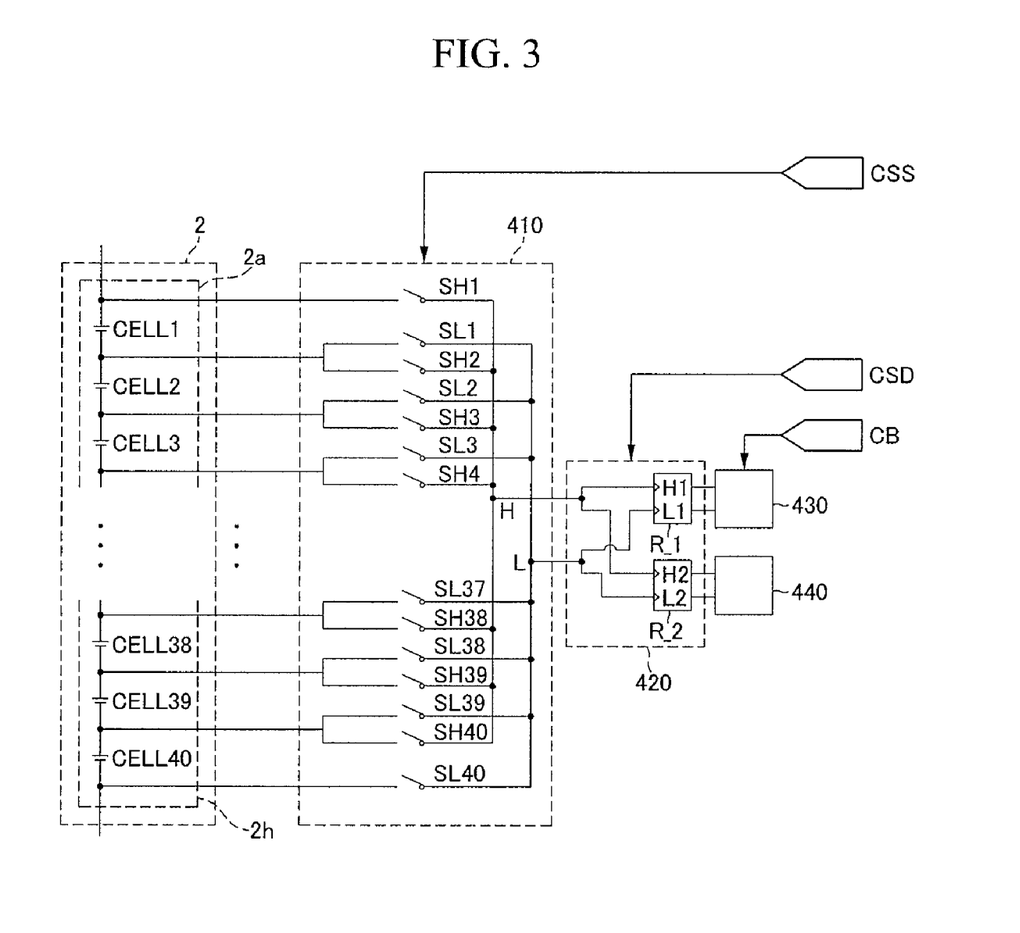
FIG. 3 shows a BMS that performs cell balancing according to a driving state of a vehicle.

Hereinafter, a configuration and operation for performing cell balancing according to an exemplary embodiment of the present invention will be described in further detail with reference to FIG. 2, FIG. 3, FIG. 4, and FIG. 5. The BMS and the plurality of cells are electrically coupled through the respective cell connection terminals. In FIG. 2 and FIG. 3, the connection port unit 15 is omitted for convenience of description.

FIG. 2 shows the sensing unit 10, the cell balancing unit 40, and the MCU 20 of the BMS 1 according to an exemplary embodiment of the present invention. These constituent elements are directly associated with the cell balancing operation. Wires connected to the lateral ends of each cell are coupled to the sensing unit 10 and the cell balancing unit 40, and the sensing unit 10 is coupled to the MCU 20, and therefore a measured voltage can be transmitted therethrough. In addition, the cell balancing unit 40 is coupled to the MCU 20. The MCU 20 receives information on a driving state of the vehicle from the MTCU 7. According to an exemplary embodiment of the present invention, the MCU 20 receives information on a cell voltage from the sensing unit 10, determines the necessity of the cell balancing operation, and controls the cell balancing operation, but this is not restrictive. Alternatively, the cell balancing unit 40 may individually include a micro control unit (MCU), may receive cell voltage information from the sensing unit 10 and the vehicle driving state from the MTCU 7, may determine the necessity of the cell balancing operation, and may control the cell balancing operation. That is, in an alternatively embodiment, the cell balancing determiner 210 and a cell balancing controller 220 can be included in the cell balancing unit 40.

The sensing unit 10 transmits a cell voltage signal SCV generated by measuring a voltage of each cell to the cell balancing determiner 210. The cell balancing determiner 210 compares a voltage of the cell voltage signal SCV with a normal range. When the voltage of the cell voltage signal SCV is not in the normal range, the cell balancing determiner 210 determines that the cell balancing operation needs to be performed. When the voltage of the cell voltage signal SCV is less than the normal range, the corresponding cell is determined to be a discharge target cell, and when the voltage of the cell voltage signal SCV is greater than the normal range, the corresponding cell is determined to be a charge target cell. The cell balancing controller 220 receives information on a cell that needs to be balanced from the cell balancing determiner 210, and transmits a cell balancing control signal CSD to the cell balancing unit 40. The cell balancing controller 220 generates the cell balancing control signal CSD according to the information on the vehicle driving state, transmitted from the MTCU 7, and information on the cell that needs to be balanced, and transmits the cell balancing control signal CSD to the cell balancing unit 40.

The vehicle driving state or operational state according to an exemplary embodiment of the present invention can be divided into a stop state, a running state, and a temporary stop state. The stop state means that the vehicle is parked and operation of the vehicle is stopped, and the temporary stop state means that the vehicle is temporarily stopped while it is running.

The BMS 1 according to an exemplary embodiment of the present invention detects a cell that needs to be balanced and performs the cell balancing operation when the vehicle driving state is set to the stop state or the temporary stop state. A different cell balancing method is used in accordance with a vehicle driving state, and a control signal CSD is also changed, accordingly. The different cell balancing method will be described in further detail later with reference to FIG. 3. The cell balancing controller 220 generates a connection control signal CSS that controls a connection between the cell that is determined to be balanced and the cell balancing unit 40 and transmits the connection control signal CSS to the cell balancing unit 40, and generates a discharge control signal CB for controlling discharge of a cell and transmits the discharge control signal CB to the cell balancing unit 40.

FIG. 3 shows a BMS that performs a cell balancing operation according to a vehicle driving state according to an exemplary embodiment of the present invention. The battery 2 includes a plurality of cells (e.g., CELL1 to CELL40), and every five cells forms one pack. Therefore, the battery 2 is formed of eight packs 2a to 2h.

The cell balancing unit 40 includes a cell balancing multiplexer 410, a cell balancing connector 420, a first cell balancing driver 430, and a second cell balancing driver 440.

The cell balancing multiplexer 410 includes a plurality of cell balancing switches SH1 to SH40 and SL1 to SL40, and the plurality of cell balancing switches SH1 to SH40 and SL1 to SL40 are turned on/off according to the connection control signal CSS. A first end of the cell balancing switch SH1 is coupled to a first end of the cell CELL1, and a second end of the cell balancing switch SH1 is electrically coupled to a first output terminal H. A first end of the cell balancing switch SL1 is coupled to a second end of the cell CELL1, and a second end of the cell balancing switch SL1 is electrically coupled to a second output terminal L.

In a like manner to the above, each of the cell balancing switches SH1 to SH40 has one end electrically coupled to one end of the corresponding cell and the other end electrically coupled to the first output terminal H. In addition, each of the cell balancing switches SL1 to SL40 has one end coupled to one end of the corresponding cell and the other end electrically coupled to the second output terminal L. The plurality of cell balancing switches SH1 to SH40 and SL1 to SL40 are turned on/off in response to the connection control signal CSS transmitted from the cell balancing controller 220. The connection control signal CSS according to an exemplary embodiment of the present invention refers to a plurality of signals respectively corresponding to the plurality of cell balancing switches SH1 to SH40 and SL1 to SL40.

Particularly, for example, when the cell balancing determiner 210 determines that the cell CELL3 needs to be balanced, the cell balancing controller 220 transmits a connection control signal CSS that turns on the cell balancing switches SH3 and SL3 to the cell balancing switches SH3 and SL3. Then, the cell balancing switches SH3 and SL3 are turned on, and the first output terminal H and the second output terminal L are respectively coupled to the lateral ends of the cell CELL3.

The cell balancing connector 420 is coupled to the first and second output terminals H and L of the cell balancing multiplexer 410, the first cell balancing driver 430, and the second cell balancing driver 440. The cell balancing connector 420 includes first and second relays R_1 and R_2 and output terminals H1 and H2 of the first and second relays R_1 and R_2 are coupled to the first output terminal H, and input terminals L1 and L2 of the first and second relays R_1 and R_2 are coupled to the second output terminal L. The first and second relays R_1 and R_2 operate according to a cell balancing control signal CSD.

In further detail, the cell balancing control signal CSD turns on the first relay R_1 when the vehicle is in the temporary stop state or the running state, and electrically couples the first cell balancing driver 430 with a cell that needs to be balanced. When the first cell balancing driver 430 is coupled with the cell, a discharge path is formed by using a resistor and reduces a voltage of the cell to thereby control the voltage of the cell to be included within the normal range. In this case, a discharge control signal CB that controls the start and end of discharge of the cell that needs to be balanced is transmitted to the first cell balancing driver 430.

When the vehicle is in the stop state, the cell balancing control signal CSD turns on the second relay R_2, and electrically couples the second balancing driver 440 with a cell that needs to be balanced.

When the vehicle is in the stop state, the second cell balancing driver 440 receives energy from a cell having a relatively high voltage among cells that need to be balanced, and transmits the energy to a cell having a relatively low voltage among the cells that need to be balanced. Then, the voltage of the cell having the relatively high voltage is reduced, and the voltage of the cell having the relatively low voltage is increased such that each of the respective cells has a voltage within the normal range.

Figure 4:
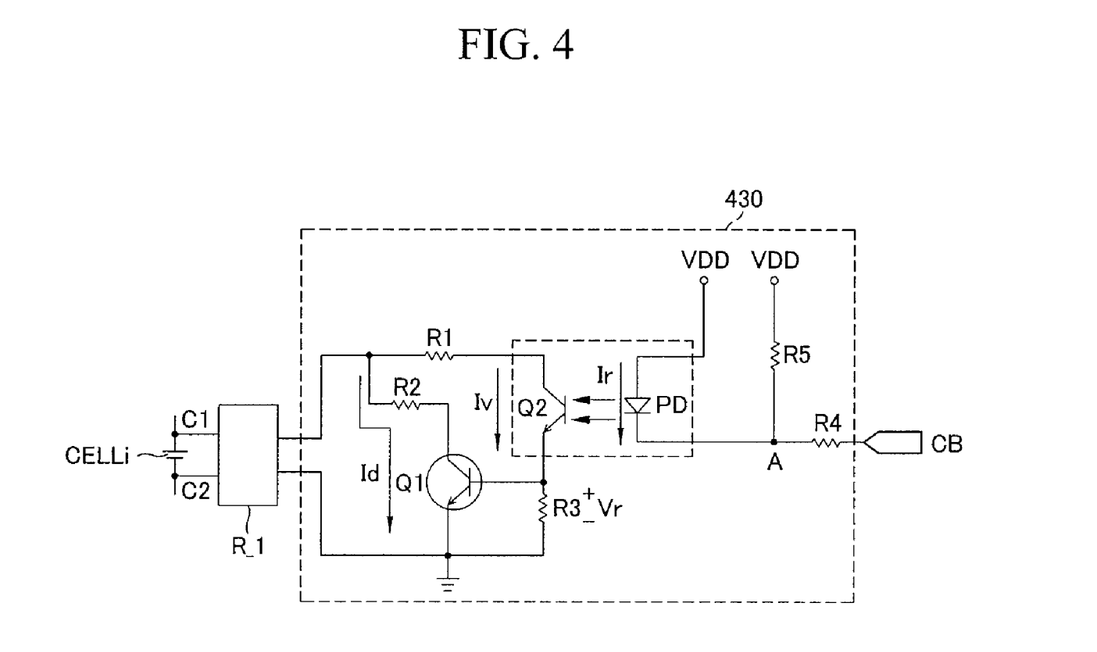
FIG. 4 shows connection between a cell that needs to be balanced among a plurality of cells, a first relay, and a first cell balancing driver.

The first cell balancing driver 430 will be described in further detail with reference to FIG. 4. FIG. 4 shows a case in which a cell CELLi among the plurality of cells needs to be balanced. In this case, the cell CELLi is coupled with the first cell balancing driver 430 through the first relay R_1.

As shown in FIG. 4, the first cell balancing driver 430 includes a plurality of resistors R1 to R5, a second transistor that forms a photocoupler, a photodiode PD, and a first transistor. The first cell balancing driver 430 is controlled by the discharge control signal CB.

In further detail, the cell balancing determiner 210 determines that the cell CELLi needs to be balanced, and transmits information on the cell CELLi to the cell balancing controller 220. The information on the cell CELLi includes identification information according to a location of the cell CELLi. Then, the cell balancing controller 220 generates a connection control signal CSS according to the identification information of the cell CELLi.

According to the connection control signal CSS, cell balancing switches SHi and SLi of the cell balancing multiplexer 410 are turned on. In addition, the cell balancing controller 220 generates a cell balancing control signal CSD for selecting one of the first cell balancing driver 430 or the second cell balancing driver 440 in accordance with a vehicle driving state transmitted from the MTCU 7, and transmits the cell balancing control signal CSD to the cell balancing connector 420. When the current vehicle driving state is set to the temporary stop state, the cell balancing control signal CSS turns on the first relay R_1 to operate the first cell balancing driver 430. Then, as shown in FIG. 4, the cell CELLi and the first cell balancing driver 430 are electrically coupled.

In this case, the discharge control signal CB is generated by the cell balancing controller 220, and controls the cell CELLi to be discharged until a voltage of the cell CELLi reaches the normal range. The cell balancing determiner 210 compares the voltage of the cell CELLi, transmitted from the sensing unit 10, with the normal range in real time, and notifies the cell balancing controller 220 that the cell balancing operation is completed when the voltage of the cell CELLi is within the normal range. Then, the cell balancing controller 220 controls the discharge control signal CB to stop the discharging of the cell CELLi. The discharge control signal CB according to an exemplary embodiment of the present invention is changed to a first level (i.e., a low level) at a discharge start time, and is maintained at the first level while the discharge is continued. When the cell balancing operation is completed, the discharge control signal is changed to a second level that is higher than the first level.

Figure 5:
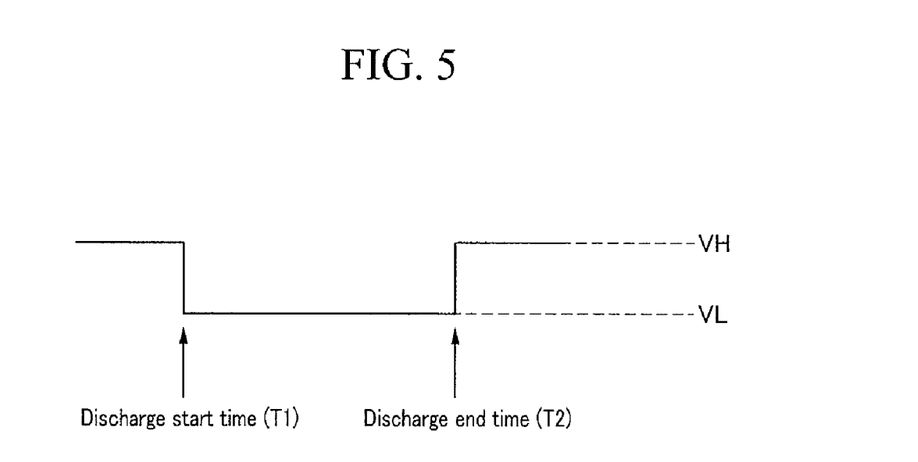
FIG. 5 shows a discharge control signal according to an exemplary embodiment of the present invention.

FIG. 5 shows a discharge control signal CB according to an exemplary embodiment of the present invention. As shown in FIG. 5, when the discharge control signal CB of the first level VL is transmitted to the first cell balancing driver 430 at the discharge start time T1, a voltage VA between a voltage of a power source VDD and the voltage of the first level VL is applied to a node A of a resistor R4 and a resistor R5. The voltage VA is determined by a resistance ratio between the resistors R4 and R5. A level of the voltage VA according to an exemplary embodiment of the present invention is set to provide a driving current to the photodiode PD.

Therefore, when the discharge control signal CB of the first level is applied, a driving current Ir is generated in the photodiode PD due to a voltage difference between the voltage of the power source VDD and the voltage VA. The photodiode PD and the second transistor Q2 that forms the photocoupler are turned on in correspondence with the driving current Ir flowing to the photodiode PD, and a bias current Iv is generated. When the bias current Iv flows, the resistor R3 is applied with the bias current Iv, and the first transistor Q1 is turned on. Through the turned-on first transistor Q1, a discharge current Id flows. Then, a discharge path formed from a first end C1 of the cell CELLi to a second end C2 is formed through the turned-on relay R_1 and the resistor R2, and the voltage of the cell CELLi is quickly reduced through the discharge current Id. When the voltage of the cell CELLi is reduced through the discharge and thus it is included within the normal range, the discharge control signal CB is changed to the second level VH at a time T2, and the discharge current Id is not generated. The first and second transistors according to an exemplary embodiment of the present invention are respectively bipolar junction transistors (BJT) having a collector electrode and an emitter electrode as two electrodes and a base electrode as a control electrode. The first and second transistors are n-channel type transistors. However, this is not restrictive, and another transistor performing the same operation can also be used.

As described, the BMS according to an exemplary embodiment of the present invention controls the voltage of the cell CELLi to be included with the normal range by forcing a discharge so as to perform the cell balancing operation when the vehicle driving state is set to the temporary stop state.

In the case that the vehicle driving state is set to the stop state, cell balancing by using the BMS and the driving method thereof according to an exemplary embodiment of the present invention will be described in further detail with reference to FIG. 6 and FIG. 7.

Unlike the temporary stop or the running state, a discharge does not need to be forcibly performed when the vehicle is in the stop state. That is, the cell balancing operation does not need to be quickly completed. Therefore, the BMS and the driving method thereof according to an exemplary embodiment of the present invention move energy of a cell having a relatively high voltage to a cell having a relatively low voltage so as to include voltages of a plurality of cells within the normal range.

Figure 6:
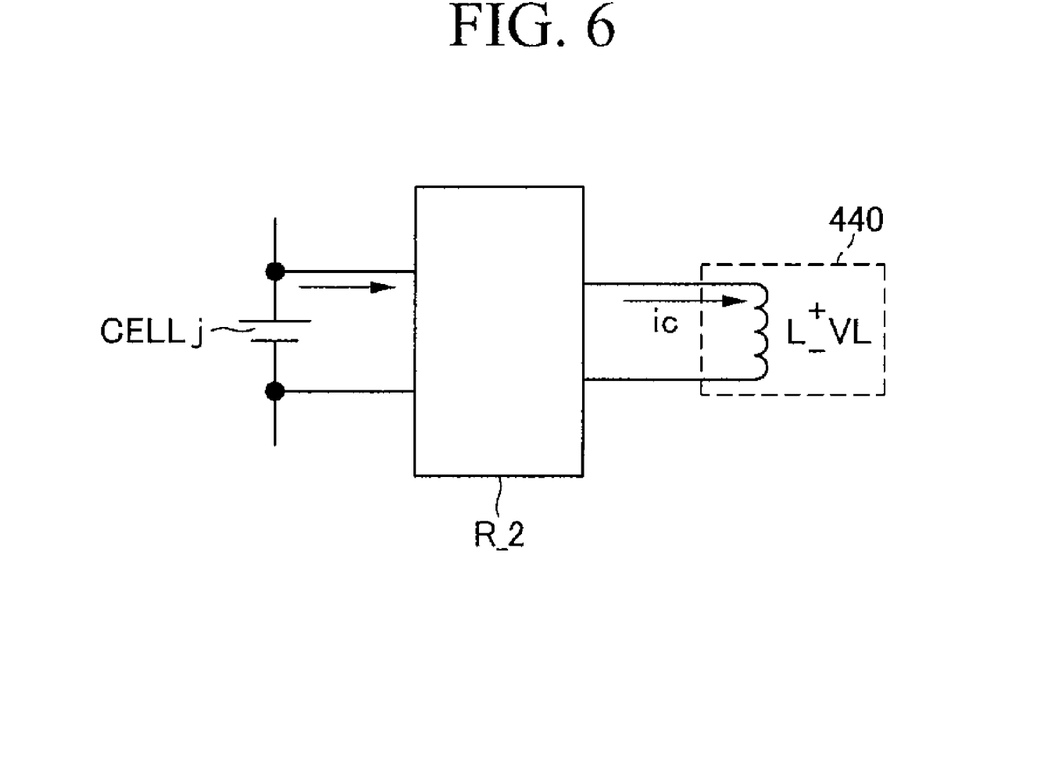
FIG. 6 shows a case in which energy from an over-charged cell is transmitted to a cell balancing driver.
Figure 7:
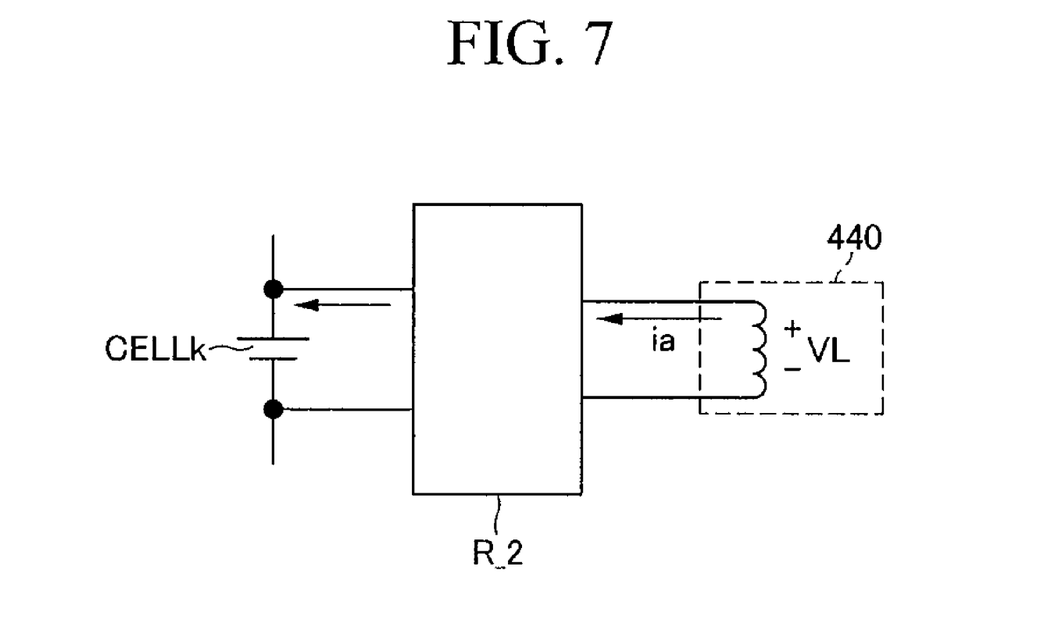
FIG. 7 shows a case in which energy from the cell balancing driver is transmitted to an over-discharged cell.

FIG. 6 and FIG. 7 show an operation of the second cell balancing driver 440 of the cell balancing unit 40 according to an exemplary embodiment of the present invention. A cell having a voltage that is greater than an average voltage of the voltages of the plurality of cells is referred to as an over-charged cell, and a cell having a voltage that is less than the average voltage is referred to as an over-discharged cell. The normal range may correspond to a range including an error range based on the average voltage, or it may correspond to the average voltage.

FIG. 6 shows a case in which energy of an over-charged cell CELLj is transmitted to the cell balancing driver 440. FIG. 7 shows a case in which the cell balancing driver 440 transmits energy to an over-discharged cell CELLk.

The cell balancing determiner 210 detects a cell that needs to be balanced from among the plurality of cells and transmits the detected cell to the cell balancing controller 220, and the cell balancing controller 220 divides an over-charged cell CELLj having a voltage that is greater than the normal range and an over-discharged cell CELLk having a voltage that is less than the normal range among cells that need to be balanced.

In addition, the cell balancing controller 220 transmits a connection control signal CSS to the cell balancing multiplexer 410 so as to turn on the cell balancing switches SHj and SLj, and transmits a cell balancing control signal CSD to the second relay R_2 so as to turn on the second relay R_2. Then, as shown in FIG. 6, the lateral ends of an inductor L of the second cell balancing driver 440 are coupled to the over-charged cell CELLj and a current ic flows to the inductor L, and accordingly a voltage VL is increased and a voltage of the over-charged cell CELLj is decreased. When the voltage of the over-charged cell CELLj reaches the normal range, the cell balancing determiner 210 informs the cell balancing controller 220 that the voltage of the over-charged cell CELLj has reached the normal range. The cell balancing controller 220 disconnects the cell balancing switches SHj and SLj and the second relay R_2 by using the connection control signal CSS and the cell balancing control signal CSD.

In addition, the cell balancing controller 220 turns on the cell balancing switches SHk and SLk and the second relay R_2 by using the connection control signal CSS and the cell balancing control signal CSD, and electrically couples the over-discharged cell CELLk and the inductor L. Then, a voltage of the inductor L becomes greater than a voltage of the over-discharged cell CELLk so that a current ia flows to the over-discharged cell CELLk. Accordingly, energy stored in the inductor L is transmitted to the over-discharged cell CELLk and the voltage of the cell CELLk is increased. When the voltage of the cell CELLk reaches the normal range, the cell balancing determiner 210 informs the cell balancing controller 220 that the voltage of the cell CELLk has reached the normal range. The cell balancing controller 220 turns off the cell balancing switches SHk and SLk by using the connection control signal CSS and the cell balancing control signal CSD, and disconnects the cell CELLk and the inductor L.

Figure 9:
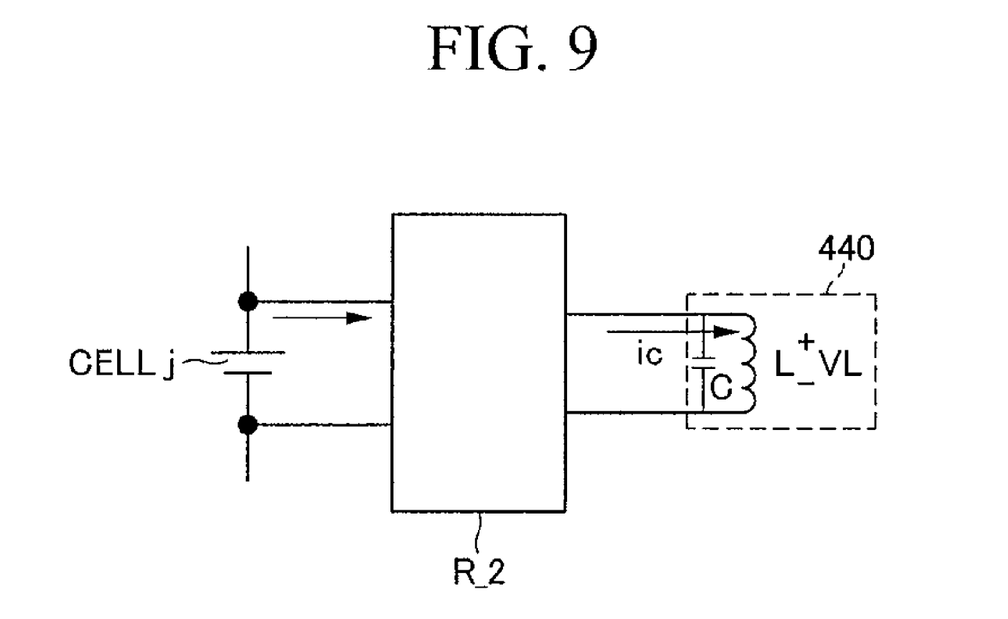
FIG. 9 and FIG. 10 depict a cell balancing driver according to another exemplary embodiment of the present invention.
Figure 10:
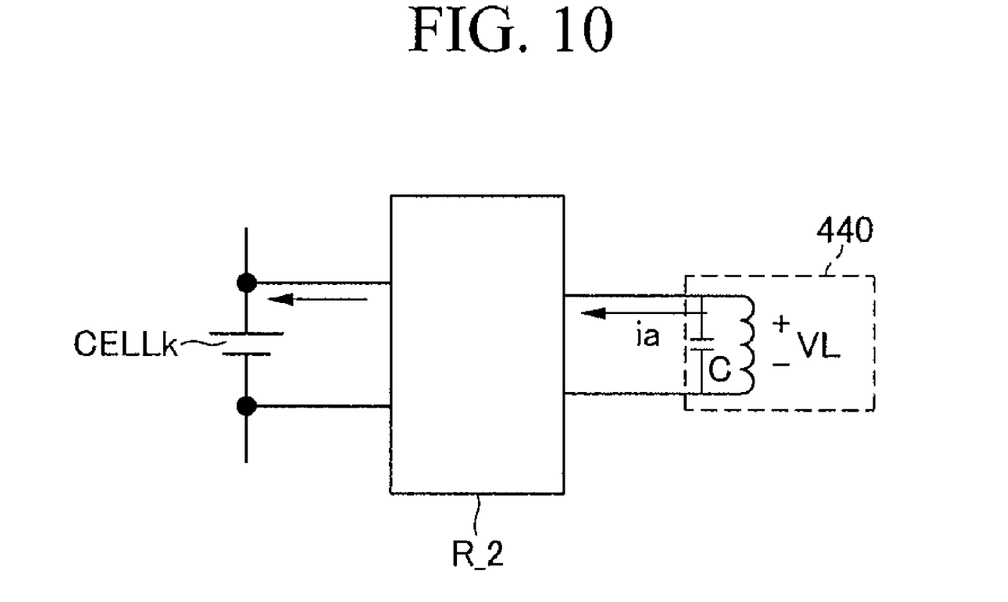

Although in FIG. 6 and FIG. 7 the second cell balancing driver 440 includes only the inductor L according to an exemplary embodiment of the present invention, it is not restrictive. For example, as depicted in FIG. 9 and FIG. 10, the second cell balancing driver 440 may further include a capacitor C for maintaining a voltage of the inductor L at a constant level.

As described, the plurality of cell voltages can be balanced to the average voltage by using the second cell balancing driver 440 including the inductor L.

A driving method of the BMS according to an exemplary embodiment of the present invention will be described with reference to FIG. 8.

Figure 8:
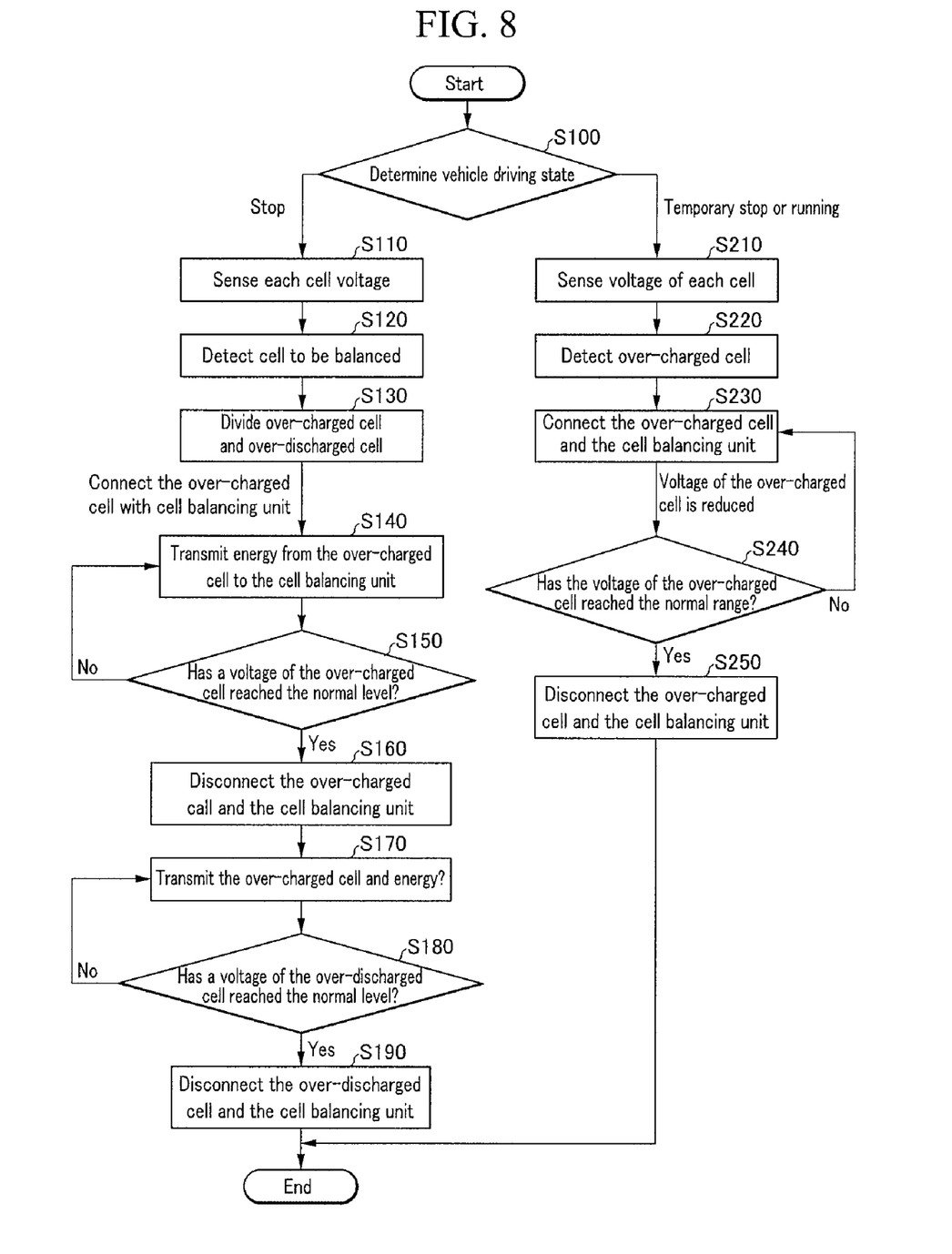
FIG. 8 is a flowchart showing a BMS driving method according to an exemplary embodiment of the present invention.

FIG. 8 is a flowchart showing a driving method of the BMS according to an exemplary embodiment of the present invention.

As shown in FIG. 8, the BMS 1 determines a driving state of the vehicle in step S100. When it is determined in step S100 that the vehicle is in the stop state, the BMS 1 senses a voltage of respective cells in step S110. The BMS 1 detects cells that need to be balanced to the average voltage based on the sensing result in step S120. The BMS 1 divides an over-charged cell and an over-discharged cell from among the detected cells in step S130. The BMS 1 controls the cell balancing unit 40 to receive energy from the over-charged cell in step S140. In addition, the BMS 1 determines whether a voltage of the over-charged cell reaches the normal range in step S150. When it is determined in step S150 that the voltage of the over-charged cell reaches the normal range, the BMS 1 disconnects the over-charged cell and the cell balancing unit 40 in step S160.

When it is determined in step S150 that the voltage of the over-charged cell has not reached the normal range, the BMS 1 controls the cell balancing unit 40 to receive the energy from the over-charged cell. After step S160, the BMS 1 connects the cell balancing unit 40 and the over-discharged cell, and the cell balancing unit 40 transmits the received energy to the over-discharged cell in step S170. The BMS 1 determines whether a voltage of the over-discharged cell reaches the normal range in step S180. When it is determined in step S180 that the voltage of the over-discharged cell has reached the normal range, the BMS 1 disconnects the over-discharged cell and the cell balancing unit 40 in step S190. When it is determined in step S180 that the voltage of the over-discharged cell has not reached the normal range, the BMS 1 controls the cell balancing unit 40 to transmit the energy to the over-discharged cell.

When it is determined in step S100 that the vehicle is in the temporary stop state or the running state, the BMS 1 senses a voltage of respective cells in step S210. The BMS 1 detects an over-charged cell that needs to be balanced based on the sensing result in step S220. The BMS 1 connects the detected over-charge cell and the cell balancing unit 40 in step S230. Then, the over-charged cell is discharged, and thus a voltage of the over-charged cell is reduced. The BMS 1 determines whether the reduced voltage has reached the normal range in step S240. When it is determined in S250 that the reduced voltage of the over-charged cell has reached the normal range, the BMS 1 disconnects the over-charged cell and the cell balancing unit 40 in step S250.

As described, the cell balancing operation can be performed in accordance with a driving state of the vehicle by using the BMS and the driving method thereof according to an exemplary embodiment of the present invention. According to an exemplary embodiment of the present invention, equalization and balancing between cells can be efficiently performed. In addition, because the BMS is formed of one chip, there is no need for increasing the amount of wiring or replacing the main controller even through the number of cells is changed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery management system for managing a battery having a plurality of cells for supplying power to a vehicle, the battery management system comprising:
   a sensing unit for measuring a voltage of each of the plurality of cells;
   a first cell balancing driver for discharging at least one first cell of the plurality of cells when the vehicle is in a temporary stop state or a running state; and
   a second cell balancing driver for transmitting the energy received from an over-charged cell to an over-discharged cell when the vehicle is in a stop state,
   wherein the battery management system detects at least one first cell among the plurality of cells needing to be balanced according to a measured voltage of each of the plurality of cells, and performs a cell balancing operation on said at least one first cell by using different methods according to operational states of the vehicle, the operational states of the vehicle comprising the temporary stop state, the running state, and the stop state.

2. The battery management system of claim 1, further comprising:
   a cell balancing determiner for detecting said at least one first cell by comparing the measured voltage for each of the plurality of cells with a normal range;
   a cell balancing controller for controlling a voltage of said at least one first cell to be discharged when the vehicle is in the temporary stop state, the running state, or the stop state; and
   a cell balancing unit for discharging the voltage of said at least one first cell.

3. The battery management system of claim 2, wherein when the vehicle is in the stop state, the cell balancing determiner detects the over-charged cell or the over-discharged cell from among the plurality of cells, and the cell balancing unit receives energy from the over-charged cell and transmits the energy received from the over-charged cell to the over-discharged cell.

4. The battery management system of claim 3, wherein the cell balancing unit comprises:
   a plurality of first cell balancing switches having first ends respectively coupled to the plurality of cells and second ends coupled to a first output terminal;
   a plurality of second cell balancing switches having first ends respectively coupled to the plurality of cells and second ends coupled to a second output terminal;
   a first relay for connecting the first cell balancing driver, the first output terminal, and the second output terminal; and
   a second relay for connecting the second cell balancing driver, the first output terminal, and the second output terminal.

5. The battery management system of claim 4, wherein when the vehicle is in the temporary stop state or the running state, the cell balancing controller turns on the first relay and turns on first switches and second switches among the plurality of first cell balancing switches and the plurality of second cell balancing switches that correspond to said at least one first cell.

6. The battery management system of claim 5, wherein the first relay has a first relay first end and a first relay second end, and wherein the first cell balancing driver comprises:
   a first resistor having a first resistor first end and a first resistor second end, the first resistor first end being coupled to the first relay first end;
   a second resistor having a second resistor first end and a second resistor second end, the second resistor first end being coupled to the first relay first end and to the first resistor first end;
   a first transistor having a first transistor first electrode, a first transistor second electrode, and a first transistor control electrode, the first transistor first electrode being coupled to the second transistor second end, the first transistor second electrode being coupled to the first relay second end;
   a second transistor having a second transistor first electrode and a second transistor second electrode, the second transistor first electrode being coupled to the first resistor second end;
   a third resistor having a third resistor first end and a third resistor second end, the third resistor first end being coupled to the second transistor second electrode and to the first transistor control electrode, the third transistor second end being coupled to the first transistor second electrode and to the first relay second end;
   a photodiode for forming a photocoupler with the second transistor, the photodiode having a photodiode anode electrode and a photodiode cathode electrode;
   a first power source coupled to the photodiode anode electrode;
   a fourth resistor having a fourth resistor first end and a fourth resistor second end, the fourth resistor first end being coupled to the photodiode cathode electrode; and
   a fifth resistor having a fifth resistor first end and a fifth resistor second end, the fifth resistor first end being coupled to the first power source, the fifth resistor second end being coupled to the fourth resistor first end and to the photodiode cathode electrode.

7. The battery management system of claim 6, wherein the cell balancing controller transmits a discharge control signal to the fourth transistor second end to permit a driving current to flow to the photodiode.

8. The battery management system of claim 7, wherein a bias current flows to the second transistor in response to the driving current, and the first transistor is turned on by a bias voltage applied to the first transistor control electrode and to the first transistor second electrode in response to the bias current and the third resistor.

9. The battery management system of claim 8, wherein when the first transistor is turned on, charges of said at least one first cell are discharged by a discharge path having the second resistor and the first transistor so that a voltage of said at least one first cell is decreased.

10. The battery management system of claim 4, wherein when the vehicle is in the stop state, the cell balancing controller turns on first switches and second switches among the plurality of first cell balancing switches and the plurality of second cell balancing switches that correspond to the over-charged cell, and turns off the first switches and the second switches when a voltage of the over-charged cell reaches the normal range.

11. The battery management system of claim 10, wherein after turning off the first switches and the second switches when the vehicle is in the stop state, the cell balancing controller turns on third switches among the plurality of first cell balancing switches corresponding to the over-discharged cell, and turns on fourth switches among the plurality of second cell balancing switches corresponding to the over-discharged cell.

12. The battery management system of claim 11, wherein when the vehicle is in the stop state, the cell balancing controller turns off the third switches and the fourth switches when the voltage of the over-discharged cell reaches the normal range.

13. The battery management system of claim 12, wherein:
the second relay has a second relay first end and a second relay second end;
the second cell balancing driver comprises an inductor having an inductor first end and an inductor second end, the inductor first end being coupled to the second relay first end, the inductor second end being coupled to the second relay second end; and
the inductor stores energy transmitted through the first switches, the second switches, and the second relay.

14. The battery management system of claim 13, wherein the energy stored in the inductor is transmitted to the over-discharged cell through the third switches, the fourth switches, and the second relay.

15. The battery management system of claim 14, wherein the second cell balancing driver further comprises a capacitor coupled in parallel with the inductor.

16. The battery management system of claim 1, further comprising a connection port unit coupled to the plurality of cells, the connection port unit coupling the battery management system and the plurality of cells.

17. The battery management system of claim 1, wherein the battery management system is formed of one chip.

18. A driving method of a battery management system for managing a battery having a plurality of cells supplying power to a vehicle, the driving method comprising:
a) determining a driving state of the vehicle;
b) sensing a voltage for each of the plurality of cells;
c) determining a cell needing to be balanced from among the plurality of cells; and
d) performing a cell balancing operation on the cell by using different methods depending upon an operational state of the vehicle, the operational state being one of a plurality of states comprising a running state, a temporary stop state, and a stop state,
wherein when the vehicle is in the stop state, determining the cell needing to be balanced comprises detecting an over-charged cell and an over-discharged cell from among the plurality of cells, and performing the cell balancing operation comprises performing the cell balancing operation on the over-charged cell and the over-discharged cell by transmitting energy from the over-charged cell to the over-discharged cell in the stop state only.

19. The driving method of claim 18, wherein when the vehicle is in a temporary stop state or a running state, determining a cell needing to be balanced comprises detecting an over-charged cell, and performing a cell balancing operation comprises performing the cell balancing operation by discharging the over-charged cell.

* * * * *